(12) United States Patent
Jo

(10) Patent No.: US 6,559,609 B1
(45) Date of Patent: May 6, 2003

(54) RASTER CENTER CONTROL CIRCUIT FOR CRT-TYPE DISPLAY DEVICE

(75) Inventor: Sang-soo Jo, Sihung-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,300

(22) Filed: Dec. 28, 1998

(30) Foreign Application Priority Data

Dec. 26, 1997 (KR) .............................................. 97-74266
Jun. 29, 1998 (KR) .............................................. 98-24956

(51) Int. Cl.$^7$ ................................................ G09G 1/04
(52) U.S. Cl. ............ 315/364; 315/368.21; 315/368.22; 345/10; 345/11; 345/12; 345/13; 345/14; 345/15; 345/16; 348/177; 348/180; 348/190
(58) Field of Search ............................... 345/13, 11, 10, 345/12, 14, 15, 16; 348/190, 177, 180; 315/364, 368.2, 368.22

(56) References Cited

U.S. PATENT DOCUMENTS

| | | | | |
|---|---|---|---|---|
| 4,733,296 A | * | 3/1988 | Honbo et al. .................. 358/51 |
| 5,381,174 A | * | 1/1995 | De Groot et al. ............ 348/207 |
| 5,396,257 A | * | 3/1995 | Someya et al. ................. 345/1 |
| 5,504,521 A | * | 4/1996 | Webb et al. ................. 348/180 |
| 5,550,441 A | * | 8/1996 | George ......................... 315/371 |
| 6,091,212 A | * | 7/2000 | Park ............................ 315/370 |

* cited by examiner

Primary Examiner—Richard Hjerpe
Assistant Examiner—Jean Lesperance
(74) Attorney, Agent, or Firm—Staas & Halsey LLP

(57) ABSTRACT

A raster center control circuit for a CRT-type display device that automatically determines a correct horizontal center position of a raster, regardless of a horizontal sync frequency input from a video card. The raster center control circuit includes a horizontal deflection circuit, electrically connected to a horizontal deflection yoke, to supply the horizontal deflection yoke with a parabolic wave signal used to determine a horizontal center position of the raster. A memory device stores predetermined values for raster control according to horizontal sync signal frequencies. A microprocessor determines a frequency of a horizontal sync signal and generates a raster control signal by converting one of the predetermined values stored in the memory device into a raster control signal according to the predetermined frequency. An operational amplifier, connected to the horizontal deflection circuit, controls the horizontal center position of the raster by summing the raster control signal with the parabolic wave signal of the horizontal deflection yoke. The operational amplifier is operated by an independent voltage source. A reference of the independent voltage source is applied to a non-inverting input of the operational amplifier, and is coincident with the parabolic wave signal of the horizontal deflection yoke.

21 Claims, 2 Drawing Sheets

RASTER CENTER CONTROL CIRCUIT FOR CRT-TYPE DISPLAY DEVICE

CROSS-REFERENCE TO RELATED APPLICATION

This application makes reference to, incorporates the same herein, and claims all benefits accruing under 35 U.S.C. §119 from utility model applications entitled Wide Range Raster Control Circuit for a Display Apparatus and A Wide Range Raster Control Circuit in a Display Device earlier filed in the Korea Industrial Property Office on Dec. 26, 1997 and Jun. 29, 1998 and duly assigned Serial Nos. 97-074266 and 98-024956, respectively, by that Office.

BACKGROUND OF THE INVENTION

1. Field of the Invention

The present invention relates to CRT-type display devices and, more particularly, to a raster center control circuit for a CRT-type display device, such as a monitor, which uses a linear current controller that receives a microprocessor control signal generated based on raster centering data stored in a memory device, to automatically control a horizontal center position of a raster over a wide frequency range of horizontal synchronization.

2. Description of the Related Art

As shown in FIG. 1, generally, a conventional deflection circuit for operation with a deflection yoke of a CRT-type display device typically requires raster controlling means to determine a center position of a raster with respect to a CRT screen. Horizontal raster centering is performed by controlling the current through a horizontal deflection yoke operated in accordance with a frequency of a video sync signal which, in a computer system, is supplied to the display device from a video card located in the computer's main body.

As illustrated in FIG. 1, a typical horizontal deflection circuit includes a horizontal deflection yoke 130 to regulate a horizontal display on a CRT screen of a display device according to a horizontal driving signal generated by a horizontal drive circuit (not shown). The horizontal driving signal provides the necessary current to a base of a horizontal output transistor Q1 which generates a sawtooth wave that is transmitted across a damping diode D1, a shunt capacitor C1, and the horizontal yoke 130. In order to enable the horizontal raster centering, the horizontal deflection circuit includes current controlling means 120, with one terminal connected at a node A located between a resonance coil L1 and a resonance capacitor C3, and another terminal connected at a node B located between the horizontal deflection yoke 130 and an S-correction capacitor C2.

Current controlling means 120 establishes horizontal raster positioning by adding or subtracting an appropriate DC current level to be summed, or integrated with the current flowing in the horizontal deflection yoke 130, which is a parabolic wave signal. In this way, the proper control or centering of horizontal raster positioning is accomplished by carefully varying the level and direction of the DC current integrated with the parabolic wave signal that is present at node B. This process, known as raster biasing, results in a lateral shifting or horizontal roll of the display on the CRT screen. In a conventional horizontal summary circuit, a predetermined summing current is set through a manual selection/adjustment of components (e.g., switches and diodes) during a manufacturing stage carried out prior to the completion of product assembly, so that the setting is permanently fixed within the current controlling means 120 for a given display device.

The conventional horizontal deflection circuit described above, however, exhibits several weaknesses.

First, the need to manually select and adjust display circuitry increases assembly time, which increases the tendency for errors. In addition, manual selection of components provides for a limited degree of adjustment, and is unable to provide for very minute control, which therefore leads to minor inaccuracies in horizontal centering.

Second, the above-described current controlling means is inherently limited in the type of monitor system that is employed. That is, the current controlling means 120 is most suitable for a given horizontal frequency that is permanently fixed, and thus provides poor adaptability for a wide range of horizontal sync frequencies.

Third, in many systems incorporating the above-described conventional raster centering technique, improper raster biasing occurs at a high rate among manufactured display devices. For example, should a discrepancy exist between the size, or width, of front and back porches of a horizontal blanking signal, that is, when the sync signal is not precisely centered within a blanking pulse, improper raster biasing is likely. When an overly narrow blanking pulse is used, as is the case with some computer systems, such as Macintosh computers for example, proper raster biasing is difficult to achieve.

SUMMARY OF THE INVENTION

Accordingly, in order to overcome such drawbacks in the conventional art, it is therefore an object of the present invention to provide a raster center control circuit in which more precise raster centering is performed automatically.

It is another object of the present invention to provide a raster center control circuit which reduces product assembly costs while increasing reliability.

It is still another object of the present invention to provide a raster center control circuit in which proper raster centering can be accomplished over a wide range of horizontal sync frequencies.

It is yet still another object of the present invention to provide a raster center control circuit which achieves proper raster centering for all types of computer systems, including those employing horizontal blanking pulses having narrow porches, or poorly centered sync pulses.

The above and other objects and advantages of the present invention can be achieved by a raster center control circuit for controlling horizontal rastering of a CRT-type display device that includes a horizontal deflection circuit electrically connected to a horizontal deflection yoke of the CRT-type display device, that supplies the horizontal deflection yoke with a parabolic wave signal used to determine a horizontal center position of the horizontal raster displayed on the CRT-type display device. A memory device stores predetermined raster control values according to horizontal sync signal frequencies, and a microprocessor determines a horizontal sync signal frequency and generates a raster control signal corresponding to the predetermined raster control values stored in the memory device and the determined horizontal sync signal frequency. A linear control circuit, connected to the horizontal deflection circuit, integrates the raster control signal, generated by the microprocessor, with the parabolic wave signal supplied by the horizontal deflection circuit to the horizontal deflection yoke, to control the horizontal center position of the raster.

In the raster center control circuit of the present invention, the memory device is preferably an EEPROM and the linear control circuit is preferably an operational amplifier capable of high current output.

Objects of the invention are also achieved by a raster center control circuit for controlling a raster displayed on a display device that includes a memory device to store raster control values according to horizontal sync frequencies of a video signal, and a microprocessor to generate a raster control signal corresponding to the stored raster control values and an input frequency of a video sync signal. A raster controller outputs a current signal corresponding to the raster control signal generated by the microprocessor, to control raster centering of the display device, and the current signal from the raster controller is integrated with a parabolic wave signal supplied to the horizontal deflection yoke.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Reference will now made in detail to the present preferred embodiment of the present invention, examples of which are illustrated in the accompanying drawings. The embodiment is described below in order to explain the present invention by referring to the figures.

Figure 1:
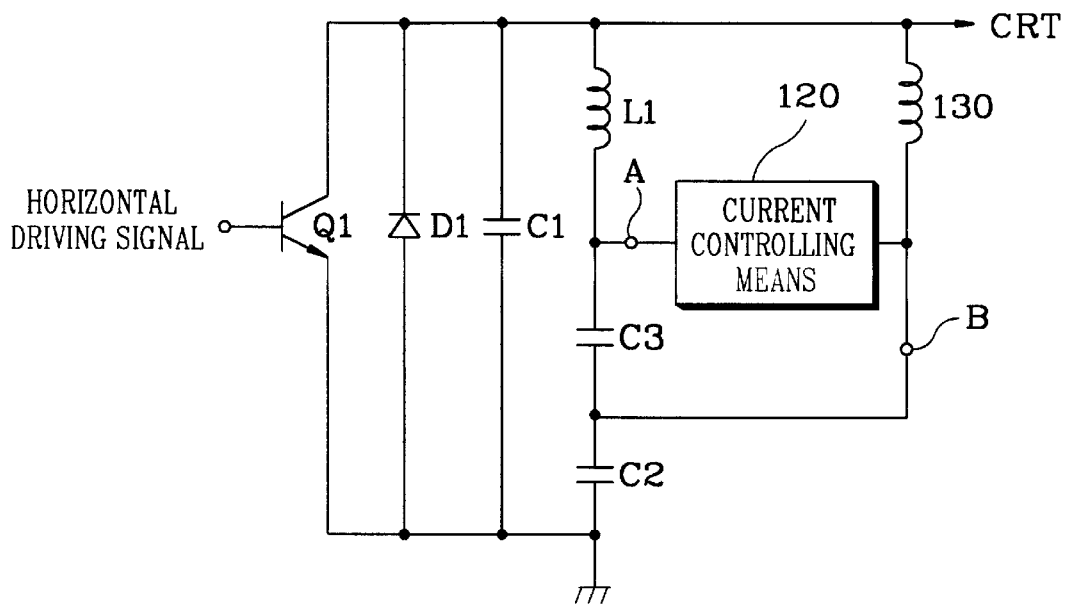
FIG. 1 is a schematic view of a conventional horizontal deflection circuit for a CRT-type display device.
Figure 2:
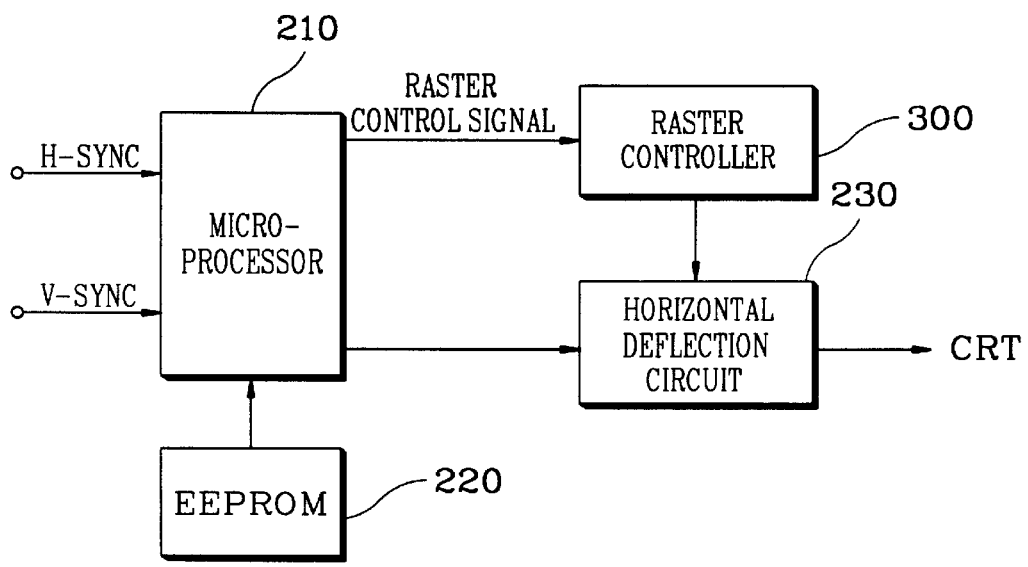
FIG. 2 is a block diagram of a raster center control circuit for a CRT-type display device according to a preferred embodiment of the present invention.

As illustrated in FIG. 2, in addition to, or as a modification in part of the conventional circuit construction illustrated in FIG. 1, a raster center control circuit according to a preferred embodiment of the present invention includes a memory device, or an EEPROM 220, a microprocessor 210 and a raster controller 300. The EEPROM 220 stores a set of predetermined values used for raster centering, which are arranged according to horizontal sync frequencies, in a table, for example. The microprocessor 210 determines an input frequency of a video sync signal, to output a raster control signal by converting the values stored in the EEPROM 220 into a pulse-width-modulated (PWM) signal according to the determined frequency. The raster controller 300 controls raster centering based on the raster control signal, by outputting a current signal that is summed with a parabolic wave signal supplied to the horizontal deflection yoke 130.

The raster controller 300 operates using an independent, or isolated voltage source which is derived separately from sources used for other circuits of the display device. A positive floating voltage source and a negative floating voltage source are applied to the raster controller 300, which are symmetrical with respect to a floating voltage reference common to a static terminal (node B of FIG. 1) of the horizontal deflection yoke. The raster controller 300 essentially includes a linear control circuit with an operational amplifier, similar to an operational amplifier used in an ordinary audio circuit, capable of outputting high current levels.

Figure 3:
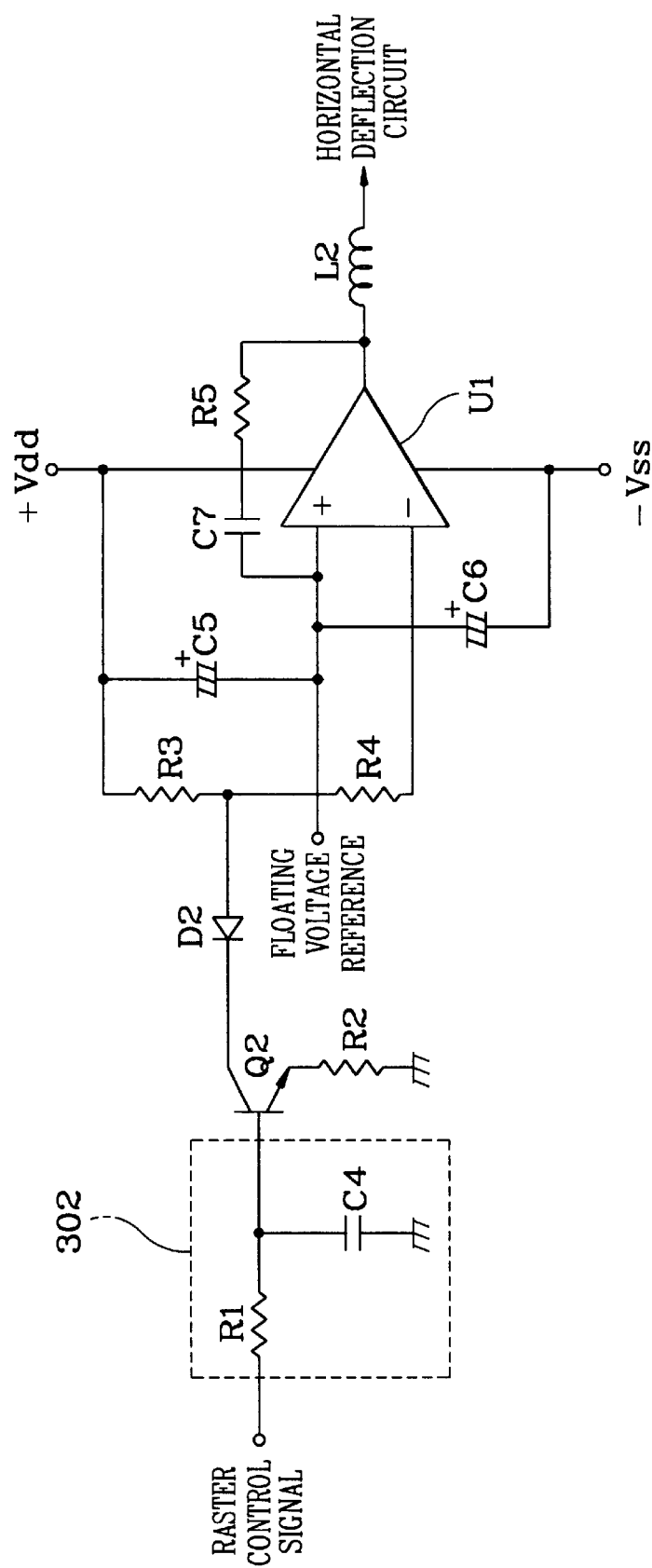
FIG. 3 is a schematic view of a raster controller of the raster center control circuit of FIG. 2, according to the preferred embodiment of the present invention.

As illustrated in FIG. 3, according to the preferred embodiment of the present invention, the raster controller 300 includes an integrator 302 with a resistor-capacitor network that includes a resistor R1 and a capacitor C4. The integrator 302 integrates the PWM signal, or raster control signal, output from the microprocessor 210. A current-controlling transistor Q2 receives the integrated PWM signal at a base of the current-controlling transistor Q2, and a limiting resistor R2 is connected at an emitter of the current-controlling transistor Q2. A series diode D2 is connected to a collector of the current-controlling transistor Q2 to allow positive voltage biasing. A pair of voltage-dividing resistors R3 and R4 are connected in series between the positive floating voltage source and an inverting input of an operational amplifier U1, so that the integrated and current-controlled raster control signal is received at the junction node of the voltage-dividing resistors R3 and R4.

A positive floating voltage source +Vdd and a negative floating voltage source −Vss are applied to the operational amplifier U1. Polarized capacitors C5 and C6, respectively, are connected between the positive floating voltage source +Vdd and the negative floating voltage source −Vss and a floating voltage reference. A feedback resistor R5 and a feedback capacitor C7 are connected in series between an output of the operational amplifier U1 and a non-inverting input of the operational amplifier U1, and a series coil L2 is connected between the output of the operational amplifier U1 and a horizontal deflection circuit 230 at a point correlated to node A of FIG. 1.

In the operation of the raster center control circuit according to the embodiment of the present invention, the microprocessor 210 generates a PWM signal corresponding to appropriate raster data values stored in the EEPROM 220 as a raster control signal for horizontal centering. The raster data values are retrieved from the EEPROM 220 based on a discriminated horizontal sync frequency supplied from a video signal source (not shown). Alternatively, the microcomputer 210 may be operated without incorporating an internally provided analog-to-digital convertor so that a DC voltage is output to the raster controller 300, in which case the integrator 302 would be omitted from circuit operation.

The integrated PWM signal, being representative of the raster control signal, is applied to the base of the current-controlling transistor Q2 of the raster controller 300. As a result, a DC current signal established in accordance with an emitter current flowing through the limiting resistor R2 is voltage-divided in accordance with a ratio established by the voltage-dividing resistors R3 and R4, and is applied to the inverting input of the operational amplifier U1. Meanwhile, a parabolic wave detected at node B, i.e., the connection node between the horizontal deflection yoke 130 and S-correction capacitor C2 of FIG. 1, is provided to the non-inverting input of the operational amplifier U1 as a reference of the positive floating voltage source +Vdd and the negative floating voltage source −Vss. In this way, the DC current level of the horizontal parabolic wave, provided to the non-inverting input of the operational amplifier U1 as the floating voltage reference, is controlled by the raster control signal provided to the inverting input of the operational amplifier U1, to swing between +Vdd and −Vss at the output of the raster controller 300, to be summed with the yoke current.

The predetermined raster control value stored in the EEPROM 220 according to the input horizontal sync frequency, and output from the microprocessor 210 as a raster control signal, is used to generate a current signal that is output to the horizontal deflection circuit 230. In doing so, the phase of the current flowing to the horizontal deflection yoke 130, i.e., the parabolic wave present at node B, which establishes the raster's horizontal centering, is offset according to the horizontal sync signal so that horizontal raster centering is achieved regardless of input frequency. Therefore, according to the present invention, the operating frequency, or range of the horizontal sync signal does not restrict the control of raster centering, so that raster control and centering show the same results for any horizontal sync frequency.

In addition, since the raster controller of the present invention employs a linear current amplifier which utilizes a floating voltage source referencing the parabolic wave present at the static terminal of the horizontal deflection yoke 130, proper horizontal raster centering can be accomplished for any size or width of a front porch or a back porch of the horizontal blanking signal. Furthermore, raster centering can be performed automatically by storing raster centering data values in a memory device, so that manufacturing costs are reduced and more precise raster centering is achieved with a high degree of reliability.

It will be apparent to those skilled in the art that various modifications can be made in the raster center control circuit for a CRT-type display device of the present invention, without departing from the spirit of the invention. Thus, it is intended that the present invention cover such modifications as well as variations thereof, within the scope of the appended claims and their equivalents.

What is claimed is:

1. A raster center control circuit for controlling horizontal rastering of a CRT-type display device having a horizontal deflection yoke, comprising:
   a horizontal deflection circuit electrically connected to the horizontal deflection yoke, to supply the horizontal deflection yoke with a parabolic wave signal used to determine a horizontal center position of the horizontal rastering of the CRT-type display device;
   a memory device to store predetermined raster control values according to horizontal sync signal frequencies;
   a microprocessor to determine a horizontal sync signal frequency and generate a raster control signal corresponding to the predetermined raster control values stored in said memory device and the determined horizontal sync signal frequency; and
   a linear control circuit, connected to said horizontal deflection circuit, to integrate the raster control signal, generated by said microprocessor, with the parabolic wave signal supplied by the horizontal deflection circuit to the horizontal deflection yoke, to control the horizontal center position of the horizontal rastering of the CRT-type display device.

2. The raster center control circuit as claimed in claim 1, wherein the raster control signal generated by said microprocessor is a pulse-width-modulated signal.

3. The raster center control circuit as claimed in claim 2, wherein said linear control circuit includes an integrator.

4. The raster center control circuit as claimed in claim 1, wherein the raster control signal generated by said microprocessor is a DC voltage signal.

5. The raster center control circuit as claimed in claim 1, wherein said memory device is an EEPROM.

6. The raster center control circuit as claimed in claim 1, wherein said linear control circuit includes an operational amplifier having a high current output.

7. The raster center control circuit as claimed in claim 6, wherein the operational amplifier has an inverting input and a voltage at the inverting input is determined by the raster control signal generated by said microprocessor.

8. The raster center control circuit as claimed in claim 6, wherein the operational amplifier has a non-inverting input and is operated by an independent voltage source, and a reference of the independent voltage source is applied to the non-inverting input of said operational amplifier.

9. The raster center control circuit as claimed in claim 8, wherein the reference of the independent voltage source of said operational amplifier is coincident with the parabolic wave signal of the horizontal deflection yoke.

10. A raster center control circuit in a display device having a horizontal deflection yoke, comprising:
    a memory device to store raster control values according to a horizontal sync frequency of a video signal;
    a microprocessor to generate a raster control signal corresponding to the stored raster control values and an input frequency of a video sync signal; and
    a raster controller to output a current signal corresponding to the raster control signal generated by the microprocessor, to control raster centering of the display device, wherein the current signal from the raster controller is summed with a parabolic wave signal supplied to the horizontal deflection yoke.

11. The raster center control circuit of claim 10, further comprising:
    a positive floating voltage source applied to the raster controller; and
    a negative floating voltage source applied to the raster controller, wherein the horizontal deflection yoke includes a static terminal, and the positive and the negative floating voltages are symmetrical with respect to a floating voltage reference common to the static terminal of the horizontal deflection yoke.

12. The raster center control circuit of claim 11, further comprising a horizontal deflection circuit to supply the parabolic wave signal to the horizontal deflection yoke.

13. The raster center control circuit of claim 12, wherein the parabolic wave signal supplied to the horizontal deflection yoke by the horizontal deflection circuit has a phase that is offset to achieve horizontal raster centering irrespective of the input frequency of the video sync signal.

14. The raster center control circuit of claim 12, wherein the raster controller comprises:
    an operational amplifier having an inverting input;
    an integrator, having a resistor-capacitor network, to integrate the raster control signal generated by the microprocessor and output a corresponding integrated signal;
    a current-controlling transistor to input the integrated signal from the integrator and output a corresponding current-controlled signal;
    a pair of voltage dividing resistors connected in series at a junction node that receives the output current-controlled signal, and positioned between the positive floating voltage source and the inverting input of the operational amplifier;
    a pair of polarized capacitors positioned between the positive and the negative floating voltage sources and the floating voltage reference, respectively; and
    a series coil positioned between the operational amplifier and the horizontal deflection circuit.

15. The raster center control circuit as claimed in claim 10, wherein said raster controller is a linear control circuit that includes an operational amplifier having an inverting input and a high current output, and a voltage at the inverting input of the operational amplifier is determined by the raster control signal generated by said microprocessor.

16. The raster center control circuit as claimed in claim 10, wherein said raster controller is a linear control circuit that includes an operational amplifier having a non-inverting input and a high current output, the operational amplifier is operated by an independent voltage source, and a reference of the independent voltage source is applied to the non-inverting input of the operational amplifier.

17. The circuit as claimed in claim 16, wherein the reference of the independent voltage source is coincident with the parabolic wave signal of the horizontal deflection yoke.

18. The raster center control circuit as claimed in claim 10, wherein said raster control signal generated by said microprocessor is a pulse-width-modulated signal.

19. The raster center control circuit as claimed in claim 10, wherein said memory device is an EEPROM.

20. A raster center control circuit to control horizontal rastering of a display device, comprising:

means for generating a raster control signal corresponding to a horizontal sync signal frequency; and means for integrating the raster control signal generated by the generating means with a parabolic wave signal, to control the horizontal rastering of the display device irrespective of a frequency of a video sync signal.

21. A raster center control circuit for controlling horizontal rastering of a CRT-type display device having a horizontal deflection yoke, comprising:

a horizontal deflection circuit connected to the horizontal deflection yoke supplying the horizontal deflection yoke with a parabolic wave signal used to determine a horizontal center position of the horizontal rastering of the CRT-type display device;

a microprocessor determining a horizontal sync signal frequency and generating a raster control signal corresponding to a predetermined raster control value and the determined horizontal sync signal frequency; and a linear control circuit, connected to said horizontal deflection circuit, integrating the raster control signal with the parabolic wave signal to control the horizontal center position of the horizontal rastering of the CRT-type display device.

* * * * *